United States Patent
Nicol et al.

(10) Patent No.: US 9,135,591 B1
(45) Date of Patent: Sep. 15, 2015

(54) ANALYSIS AND ASSESSMENT OF SOFTWARE LIBRARY PROJECTS

(71) Applicant: LinkedIn Corporation, Mountain View, CA (US)

(72) Inventors: John W. Nicol, San Jose, CA (US); Baron L. Roberts, Sunnyvale, CA (US); Jens O. Pillgram-Larsen, Pleasanton, CA (US); David P. McCutcheon, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/278,428

(22) Filed: May 15, 2014

(51) Int. Cl.
*G06F 9/44* (2006.01)
*G06Q 10/06* (2012.01)

(52) U.S. Cl.
CPC . *G06Q 10/06* (2013.01); *G06F 8/70* (2013.01)

(58) Field of Classification Search
None
See application file for complete search history.

(56) References Cited

U.S. PATENT DOCUMENTS

| | | | | |
|---|---|---|---|---|
| 6,405,364 | B1* | 6/2002 | Bowman-Amuah | 717/102 |
| 7,389,495 | B2* | 6/2008 | Wang et al. | 717/126 |
| 7,743,423 | B2* | 6/2010 | Lange et al. | 717/126 |
| 8,448,128 | B2* | 5/2013 | Donaldson | 717/102 |
| 8,656,365 | B2* | 2/2014 | Rama et al. | 717/126 |
| 8,719,780 | B2* | 5/2014 | Selitser et al. | 717/120 |
| 8,776,011 | B2* | 7/2014 | Sharma et al. | 717/102 |
| 8,799,858 | B2* | 8/2014 | Martinez Canedo et al. | 717/120 |
| 8,799,862 | B2* | 8/2014 | Adamson | 717/102 |
| 8,819,638 | B2* | 8/2014 | Sharma et al. | 717/126 |
| 8,832,649 | B2* | 9/2014 | Bishop et al. | 717/120 |
| 8,875,093 | B2* | 10/2014 | Balasubramanian et al. | 717/102 |
| 8,959,488 | B2* | 2/2015 | Lauff et al. | 717/120 |
| 2012/0331441 | A1* | 12/2012 | Adamson | 717/126 |
| 2013/0086553 | A1* | 4/2013 | Grechanik | 717/120 |

OTHER PUBLICATIONS

Chipounov, et al., "S2E: A Platform for In-Vivo Multi-Path Analysis of Software Systems"; 2011, ACM; [retrieved on Jun. 26, 2015]; Retrieved from Internet <URL: http://dl.acm.org/citation.cfm?id=1950365.1950396>;pp. 265-278.*

Zhang, et al., "S2PF: Speculative Symbolic PathFinder"; 2012 ACM SIGGSOFT Software Engineering Notes; [retrieved on Jun. 26, 2015]; Retrieved from Internet <URL: http://dl.acm.org/citation.cfm?id=2382792&CFID=523422672&CFTOKEN=10076701>;pp. 1-5.*

(Continued)

*Primary Examiner* — Xi D Chen
(74) *Attorney, Agent, or Firm* — Park, Vaughan, Fleming & Dowler LLP; Chia-Hsin Suen (57) ABSTRACT

The disclosed embodiments provide a method, system, and apparatus for facilitating use of a software library project. During operation, the system obtains a set of data associated with use of the software library project, wherein the data comprises a set of dependencies of calls and objects associated with the software library project. Next, the system applies a set of business rules to the data to assess one or more characteristics associated with the software library project. The system then enables use of the data and the one or more characteristics in assessing a health of the software library project.

16 Claims, 7 Drawing Sheets

(56) References Cited

OTHER PUBLICATIONS

Dwyer, et al., "Analyzing Interaction Orderings with Model Checking", 2004, Proceedings of the 19$^{th}$ International Conference on Automated Software Engineering; [retrieved on Jun. 26, 2015]; Retrieved from Internet <http://ieeexplore.ieee.org/stamp/stamp.jsp?tp=&arnumber=1342733>;pp. 1-5.*

Bertels, et al., "A Cognitive Approach to Program Understanding", 1993 IEEE; [retrieved on Jun. 26, 2015]; Retrieved from Internet <http://ieeexplore.ieee.org/stamp/stamp.jsp?tp=&arnumber=287784>;pp. 1-7.*

* cited by examiner

Obstreperous 2.4: Class Details

| Class | Dependers | Dependencies |
|---|---|---|
| Obstrep | 510 | 100 |
| Serial | 500 | 50 |
| Compare | 490 | 30 |
| Util | 450 | 120 |
| String | 200 | 30 |
| Object | 190 | 1 |
| Flyer | 180 | 100 |
| Test | 100 | 10 |
| Obt | 10 | 1 |
| Temp | 5 | 1 |
| Blah | 3 | 27 |
| Foo | 3 | 10 |
| Johnz | 1 | 11 |
| Baronz | 1 | 13 |
| Doodz | 1 | 254 |

| Obstreperous 2.4 'Obstrep' Class: Method Details ||| 
| Method Signature | Dependers | Dependencies |
| --- | --- | --- |
| public int callfunc(int) | 510 | 10 |
| public int callfunc(int, int int) | 100 | 50 |
| public void callfunc(int, String) | 50 | 30 |
| public void uselessCall() | 4 | 120 |

Obstreperous Project Details

| Version | Status | Dependers | Dependencies |
|---|---|---|---|
| 0.0.1 | RED | 3 | 7 |
| 0.0.7-beta2 | RED | 5 | 10 |
| 0.9 | YELLOW | 10 | 17 |
| 1.0 | GREEN | 37 | 61 |
| 1.0.1 | RED | 11 | 60 |
| 1.0.1-hotfix | GREEN | 87 | 61 |
| 2.3 | YELLOW | 30 | 72 |
| 2.4 | GREEN | 231 | 75 |
| 5.7 | YELLOW | 12 | 125 |

ANALYSIS AND ASSESSMENT OF
SOFTWARE LIBRARY PROJECTS

BACKGROUND

1. Field

The disclosed embodiments relate to software library projects. More specifically, the disclosed embodiments relate to techniques for performing analysis and assessment of software library projects.

2. Related Art

Source code of newly developed software projects typically calls or references external application programming interfaces (APIs) of existing software libraries. By making calls to the external APIs, developers of the software project may reuse the functionality provided by the corresponding libraries and avoid reimplementation of the functionality in the software project.

However, external APIs and/or software libraries may be in various states of health, reliability, stability, and/or compatibility with the software project. For example, open source libraries may have varying numbers of contributors, commits, ingoing and outgoing dependencies, versions, and/or issues and bugs. Similarly, different versions of the same library may have different features or components, and as a result, may or may not be compatible with the software project.

As a result, development of the software project may be significantly impacted by the selection of specific libraries for use with the software project. For example, the calling of APIs in libraries that are stable, popular, actively managed, and/or otherwise healthy may simplify the development and implementation of the software project. On the other hand, the calling of APIs in libraries that are unstable, buggy, poorly maintained, and/or otherwise unhealthy may incur overhead associated with adapting the software project to changes in the libraries and/or taking on the responsibility of maintaining the libraries.

Consequently, use of software libraries may be facilitated by mechanisms for assessing the health of the software libraries.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
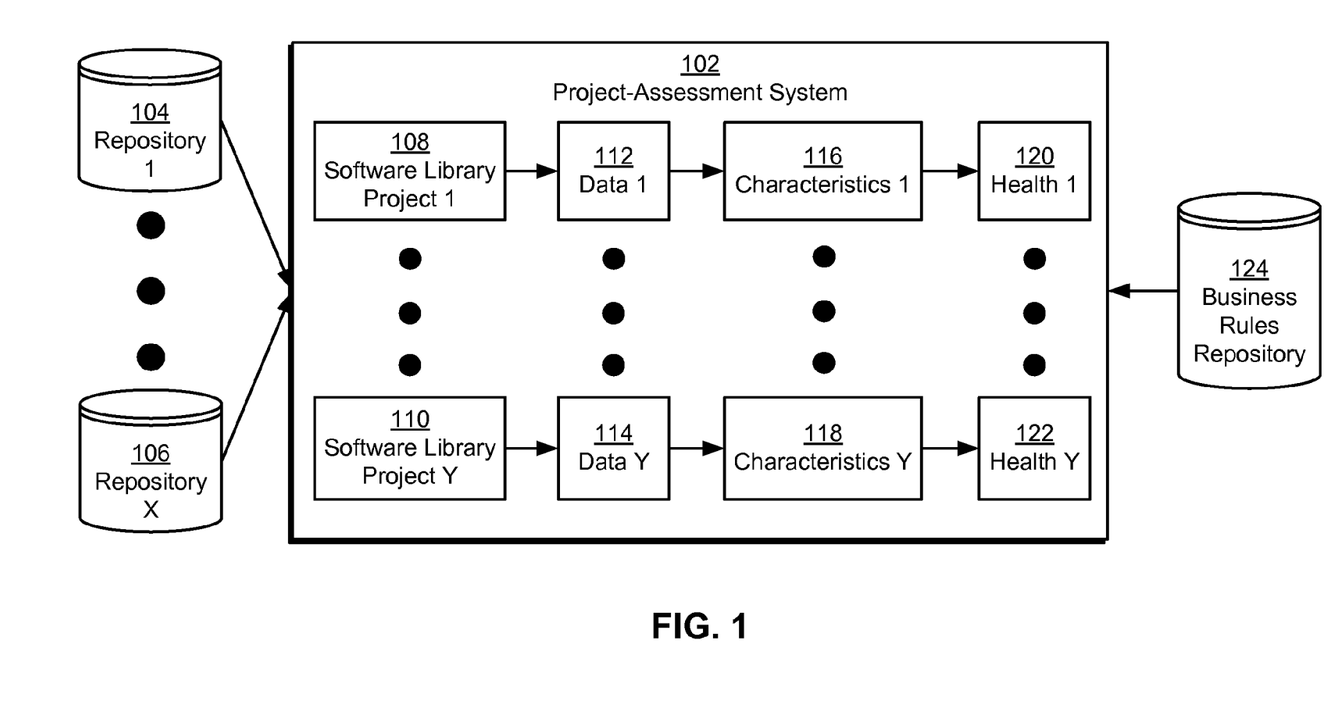
FIG. 1 shows a schematic of a system in accordance with the disclosed embodiments.

The disclosed embodiments provide a method, system, and apparatus for facilitating use of a software library project, such as a project associated with the development of an open source library and/or a private software library. For example, the disclosed embodiments may facilitate decisions related to using software library projects and/or associated application programming interfaces (APIs) with software under development. As shown in FIG. 1, the system may correspond to a project-assessment system 102 that facilitates the analysis and assessment of health (e.g., health 1 120, health y 122) for a set of software library projects (e.g., software library project 1 108, software library project y 110).

In particular, project-assessment system 102 may locate the software library projects in a set of repositories (e.g., repository 1 104, repository x 106), such as public, open source repositories and/or private, internal repositories. For example, websites associated with public repositories may be crawled to identify software library projects hosted on the repositories, and listings of software library projects hosted on private repositories may be obtained from the private repositories with the proper access credentials.

Next, project-assessment system 102 may obtain a set of data (e.g., data 1 112, data y 114) associated with use of each software library project. As described in further detail below with respect to FIG. 2, the data may include dependencies of calls and objects associated with the software library project, including incoming and outgoing dependencies. The data may also include an activity history associated with the calls and the objects, a syntactic structure associated with the calls and the objects, version information associated with the software library project, and/or licensing information associated with the software library project.

Project-assessment system 102 may then apply a set of business rules from a business rules repository 124 to the data to assess one or more characteristics (e.g., characteristics 1 116, characteristics y 118) associated with the software library project. For example, project-assessment system 102 may use the business rules to determine characteristics associated with the software library project's activity, popularity, compatibility, stability, and/or licensing.

Finally, project-assessment system 102 may enable use of the data and characteristics in assessing the health (e.g., health 1 120, health y 122) of the software library project. For example, project-assessment system 102 may provide the data and/or characteristics to users (e.g., developers, architects) associated with development of software that may depend on and/or use the software library project. Project-assessment system 102 may also provide visualizations associated with the data and/or characteristics to the users. Consequently, project-assessment system 102 may facilitate the use and/or adoption of healthy (e.g., reliable, stable, popular, active, compatible, etc.) software library projects and/or APIs by the users, which in turn may simplify the process of developing new software.

Figure 2:
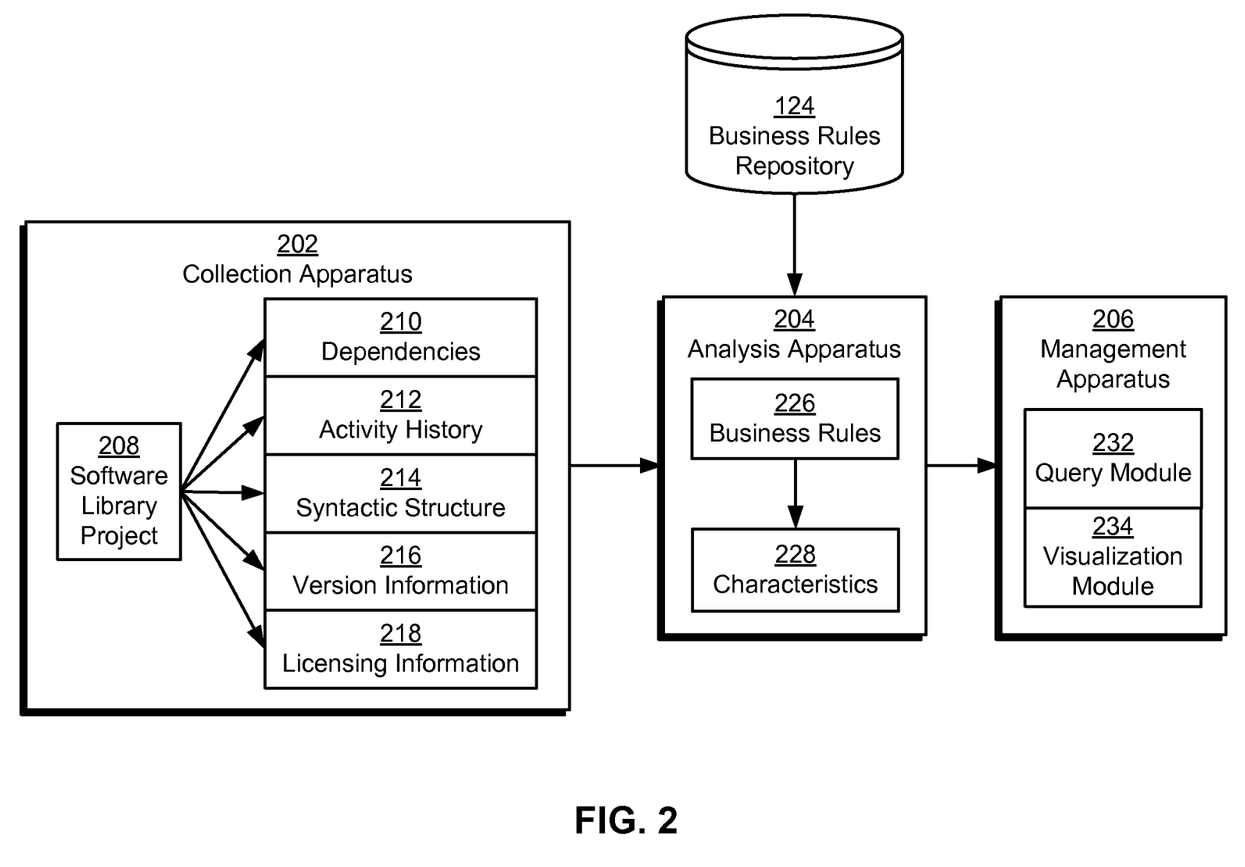
FIG. 2 shows a system for facilitating use of a software library project in accordance with the disclosed embodiments.

FIG. 2 shows a system for facilitating use of a software library project in accordance with the disclosed embodiments. As mentioned above, the system may be a project-assessment system (e.g., project-assessment system 102 of FIG. 1) that enables the analysis and assessment of the health of a software library project 208. As shown in FIG. 2, the system includes a collection apparatus 202, an analysis apparatus 204, and a management apparatus 206. Each of these components is described in further detail below.

Collection apparatus 202 may obtain data associated with use of software library project 208. For example, collection apparatus 202 may locate software library project 208 in a public or private repository (e.g., source code repository). Collection apparatus 202 may then collect data related to the development and use of software library project 208 by crawling a website associated with the repository and/or indexing the contents of the repository and/or other repositories to which collection apparatus 202 has access.

In one or more embodiments, data obtained by collection apparatus 202 includes a set of dependencies 210, an activity history 212, a syntactic structure 214, version information 216, and licensing information 218. Dependencies 210 may include both outgoing and incoming dependencies of software library project 208. For example, dependencies 210 may specify other software library projects on which software library project 208 depends (e.g., calls or uses), as well as software library projects that depend on (e.g., call or use) software library project 208. Outgoing dependencies of software library project 208 may be identified by examining build files and/or source code for software library project 208. Incoming dependencies of software library project 208 may be identified by examining the build files and/or source code of other software library projects, such as software library projects hosted on the same repository as software library project 208 and/or other repositories.

Dependencies 210 may further include both direct and indirect dependencies of software library project 208. For example, dependencies 210 may include a first set of software library projects on which software library project 208 directly depends, as well as a second set of software library projects on which the first set of software library projects depend. Dependencies 210 may also include a third set of software library projects that depend on software library project 208, along with a fourth set of software library projects that depend on the third set of software library projects.

Moreover, dependencies 210 may include dependencies of calls and/or objects associated with software library project 208. For example, dependencies 210 may include dependencies of specific methods, functions, classes, and/or objects of software library project 208 on other methods, functions, classes, and/or objects of software library project 208 and/or other software library projects. Dependencies 210 may also specify dependencies of specific methods, functions, classes, and/or objects of other software library projects on the methods, functions, classes, and/or objects of software library project 208. In other words, dependencies 210 associated with software library project 208 may be mapped at the subroutine, data structure, and/or API level. Dependencies 210 from lower levels (e.g., subroutine, data structure, API) may then be aggregated into dependencies for higher levels (e.g., version, project).

Activity history 212 may describe activity related to the development, update, and/or use of software library project 208. For example, activity history 212 may include a commit metric (e.g., number of commits, frequency of commits, commit dates, number of modified files, number of modified lines, number of committers) and/or a release metric (e.g., release frequency, release dates, number of releases, etc.) associated with software library project 208. Similarly, activity history 212 may include a social activity metric such as a number of followers, favorites, shares, and/or comments associated with software library project 208. Activity history 212 may further include an issue history (e.g., open and closed issues), a crash history (e.g., crashes collected from reporting tools), and/or a usage history (e.g., number of calls over time per method, function, class, API, and/or version).

Syntactic structure 214 may include an abstract syntax tree, parse tree, abstract semantic graph, and/or other structure associated with syntax analysis of software library project 208. Syntactic structure 214 may be created by parsing source code for software library project 208 and/or using reflection during execution of a binary for software library project 208. Moreover, syntactic structure 214 may facilitate the identification of dependencies 210 on the class, object, method, function, and/or API level. Syntactic structure 214 may also be associated with metrics such as a complexity metric (e.g., cyclomatic complexity) and/or size metric (e.g., lines of code, lines of comments, number of packages, number of classes, number of files, number of methods, and/or number of APIs).

Version information 216 may include data associated with different versions of software library project 208. For example, version information 216 may include version numbers and/or release dates for multiple versions of software library project 208. Version information 216 may also include compatibility information for components (e.g., features) of software library project 208. For example, version information 216 may track API changes across versions of software library project 208, including additions, removals, and/or deprecations of APIs associated with software library project 208. A version of software library project 208 that is missing a particular component, either because the component has yet to be added or has been removed or deprecated, may thus be incompatible with software that calls and/or uses the component.

Licensing information 218 may identify the type of license associated with software library project 208 and/or any rights or restrictions associated with the license. Collection apparatus 202 may obtain licensing information 218 from license files and/or source code headers in software library project 208.

After the data is obtained and/or generated by collection apparatus 202, analysis apparatus 204 may apply a set of business rules 226 from business rules repository 124 to the data to assess one or more characteristics 228 associated with software library project 208. Business rules 226 may be specific to the requirements, needs, and/or preferences of a user, group, and/or organization associated with assessing the health of software library project 208. For example, business rules 226 may specify criteria associated with adoption or use of software library project 208 by the user, group, and/or organization.

In one or more embodiments, characteristics 228 include a licensing characteristic, an activity characteristic, a popularity characteristic, a compatibility characteristic, and/or a stability characteristic. Each characteristic may include information related to the compatibility of software library project 208 with the needs and/or goals of the user, group, and/or organization.

For example, business rules 226 may specify a number of flags associated with the data and characteristics 228. If data from collection apparatus 202 matches a flag in business rules 226, the data and/or flag may be included in characteristics 228.

As a result, business rules 226 may include unacceptable licenses and/or license attributes that are used to determine the licensing characteristics of software library project 208. Business rules 226 may also include minimum and/or maximum thresholds for commit metrics (e.g., minimum number of committers, minimum commit frequency, etc.), release metrics (e.g., minimum number of releases, maximum release age, etc.), and/or social activity metrics (e.g., minimum number of followers) associated with one or more activity characteristics of software library project 208. Business rules 226 may further provide thresholds and/or ranges for dependencies 210 (e.g., minimum or maximum numbers of dependencies, ratio of incoming to outgoing dependencies) that enable the assessment of popularity characteristics of software library project 208. Similarly, business rules 226 may specify thresholds and/or ranges for API and/or version changes (e.g., minimum version release interval, maximum version age, deprecation of APIs or versions) of software library project 208 to identify the compatibility characteristics of software library project 208. Finally, business rules 226 may be used to establish known broken versions, missing portions, code quality thresholds, reliability thresholds (e.g., number of faults, bugs, crashes, issues, etc.), and/or flags indicative of stability characteristics of software library project 208.

Finally, management apparatus 206 may enable use of data from collection apparatus 202 and characteristics 228 from analysis apparatus 204 in assessing the health of software library project 208. First, management apparatus 206 may provide the data and/or characteristics 228 to one or more users (e.g., developers) through a query module 232. For example, management apparatus 206 may provide data from collection apparatus 202 in a table and/or list. Query module 232 may also allow the user(s) to filter, search, and/or sort the data.

Second, management apparatus 206 may provide visualizations of the data through a visualization module 234. The visualizations may include a chart such as a histogram or line graph of calls, commits, releases, and/or other attributes associated with software library project 208. The visualizations may also include a heat map, such as a heat map of compatibility information across different versions of software library project 208. The visualizations may additionally include a graph, such as a dependency graph of dependencies 210. The visualizations may further include a score such as a licensing score, activity score, popularity score, compatibility score, stability score, and/or overall health score for software library project 208. Finally, the visualization may include an indicator such as a color-coded indicator representing a flag, warning, and/or other attribute related to the health of software library project 208. In other words, management apparatus 206 may provide a user interface through which the user(s) may access the data, characteristics 228, and/or visualizations.

By providing data, characteristics 228, and visualizations associated with development and use of software library project 208, the system of FIG. 2 may improve the assessment of the health of software library project 208. In turn, the system of FIG. 2 may improve decision-making related to the adoption or use of software library project 208 by other software. For example, the system of FIG. 2 may allow developers of the other software to identify and use software library projects that are more reliable, stable, compatible, popular, and/or healthy. The selection and use of healthier and/or more compatible software library projects may further simplify the software development process for the developers and mitigate issues associated with adopting and/or maintaining external software libraries and/or APIs.

Those skilled in the art will appreciate that the system of FIG. 2 may be implemented in a variety of ways. First, collection apparatus 202, analysis apparatus 204, management apparatus 206, and business rules repository 124 may be provided by a single physical machine, multiple computer systems, one or more virtual machines, a grid, one or more databases, one or more filesystems, and/or a cloud computing system. Collection apparatus 202, analysis apparatus 204, and management apparatus 206 may additionally be implemented together and/or separately by one or more hardware and/or software components and/or layers.

Second, a number of data formats and/or storage mechanisms may be supported by and/or used with collection apparatus 202, analysis apparatus 204, management apparatus 206, and business rules repository 124. For example, dependencies 210, activity history 212, syntactic structure 214, version information 216, licensing information 218, business rules 226, and/or characteristics 228 may be stored in relational databases, graph databases, data warehouses, filesystems, and/or flat files. Dependencies 210, activity history 212, syntactic structure 214, version information 216, licensing information 218, business rules 226, and/or characteristics 228 may further be obtained and/or transmitted in a number of formats, including Extensible Markup Language (XML) documents, JavaScript Object Notation (JSON) objects, property lists, and/or other types of structured data.

Figure 3A:
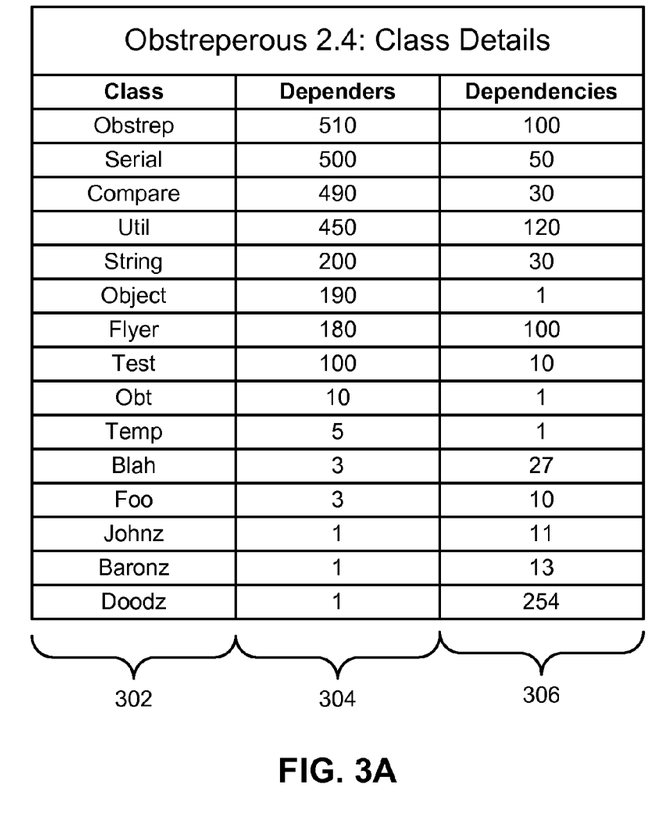
FIG. 3A shows an exemplary screenshot in accordance with the disclosed embodiments.

FIG. 3A shows an exemplary screenshot in accordance with the disclosed embodiments. More specifically, FIG. 3A shows an exemplary screenshot of a user interface for facilitating the assessment of the health of a software library project, such as the user interface provided by management apparatus 206 of FIG. 2.

As shown in FIG. 3A, the user interface includes a table with three columns 302-306. Column 302 may include classes associated with a software library project (e.g., "Obstreperous 2.4"), such as software library project 208 of FIG. 2. Column 304 may provide the number of incoming dependencies (e.g., "Dependers") for each class in column 302, and column 306 may show the number of outgoing dependencies (e.g., "Dependencies") for the class. Data in columns 302-306 may be sorted in decreasing order of values in column 304.

Consequently, the user interface may display class-level dependencies of the software library project. A user may use the class-level dependencies to determine the popularity, stability, and/or health of various classes in the software library project. For example, classes with more outgoing dependencies and fewer incoming dependencies (e.g., "Johnz," "Baronz," "Doodz") may be less popular and stable than classes with more incoming dependencies and fewer outgoing dependencies (e.g., "Serial," "Compare," "String"). In turn, more popular and/or stable classes may be better candidates for use (e.g., calling through an API) than less popular and/or stable classes.

Figure 3B:
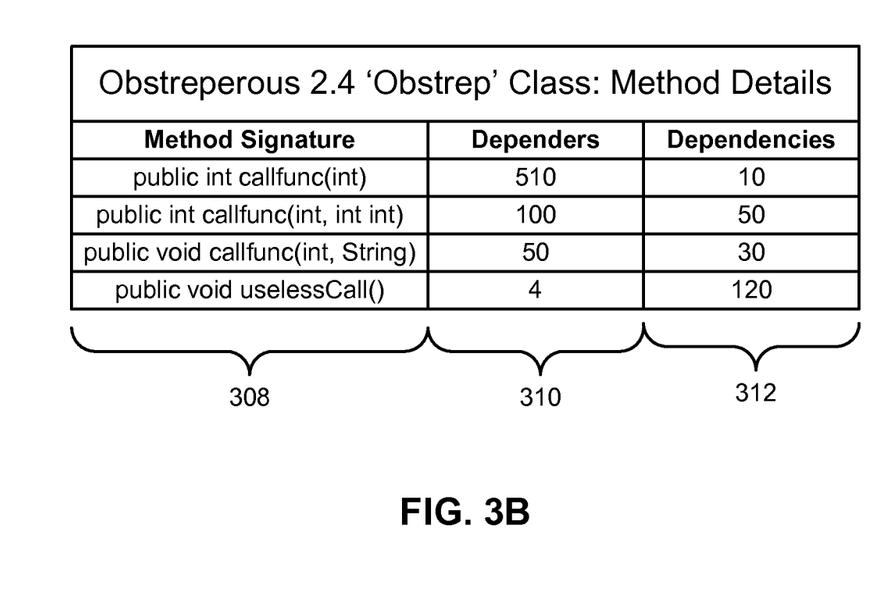
FIG. 3B shows an exemplary screenshot in accordance with the disclosed embodiments.

FIG. 3B shows an exemplary screenshot in accordance with the disclosed embodiments. Like FIG. 3A, FIG. 3B shows a screenshot of a user interface for facilitating the assessment of the health of a software library project. However, the user interface of FIG. 3B includes three columns 308-312 containing data that differs from the data in columns 302-306.

In particular, column 308 may include method signatures of methods in a class (e.g., "Obstrep") listed in the user interface of FIG. 3A. Column 310 may display the number of incoming dependencies (e.g., "Dependers") for each method signature in column 308, and column 312 may provide the number of outgoing dependencies (e.g., "Dependencies") for the method signature. Data in columns 308-312 may be sorted in decreasing order of values in column 310.

The user interface of FIG. 3B may show method-level dependencies of the "Obstrep" class in the "Obstreperous 2.4" software library project. Like the dependencies of FIG. 3A, the dependencies shown in FIG. 3B may facilitate the assessment of the popularity, stability, and/or health of methods in the class. For example, the method represented by the signature "public int callfunc(int)" may have significantly more incoming dependencies than outgoing dependencies and thus be safer to call than the method represented by the signature "public void uselessCall( )" which has significantly more outgoing dependencies than incoming dependencies.

Figure 3C:
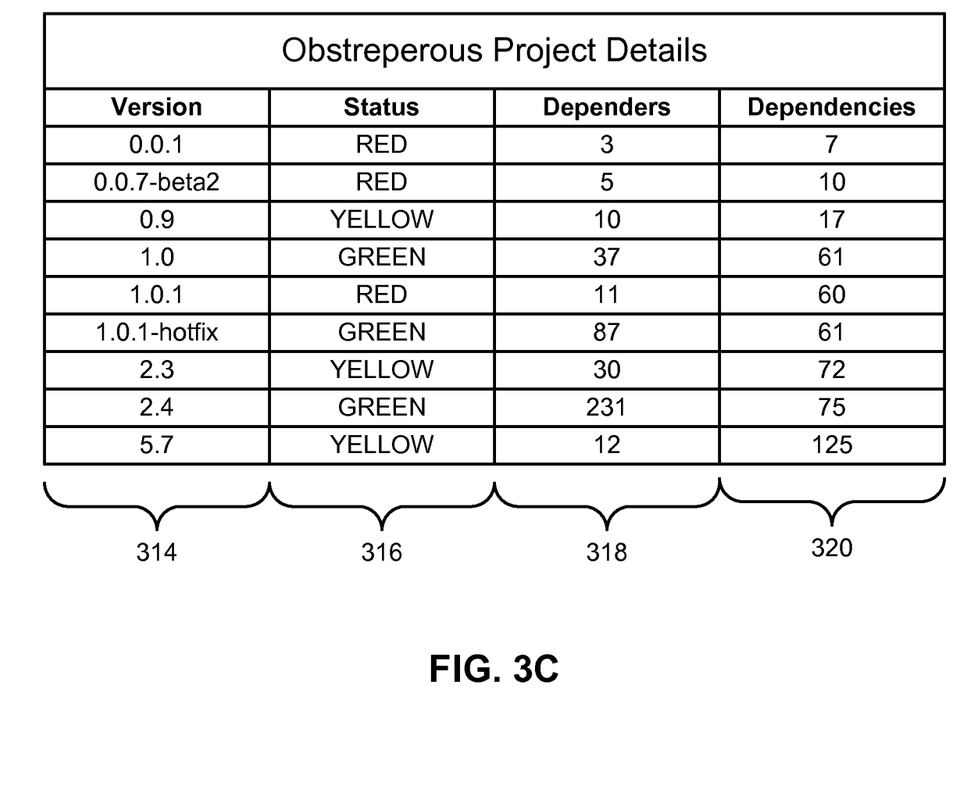
FIG. 3C shows an exemplary screenshot in accordance with the disclosed embodiments.

FIG. 3C shows an exemplary screenshot in accordance with the disclosed embodiments. Like FIGS. 3A-3B, FIG. 3C shows a screenshot of a user interface for facilitating assessment of the health of a software library project. Unlike the user interfaces of FIGS. 3A-3B, the user interface of FIG. 3C includes four columns 314-320 containing data that differs from data in columns 302-312.

As shown in FIG. 3C, column 314 may identify versions of the "Obstreperous" software library project. Column 316 may provide a status indicator for each identified version of the software library project, with "RED" indicating low health or one or more flags, "YELLOW" indicating one or more warnings or issues, and "GREEN" indicating good health (e.g., no warnings, flags, or issues). Column 318 may provide the number of incoming dependencies (e.g., "Dependers") for each version identified in column 314, and column 320 may provide the number of outgoing dependencies (e.g., "Dependencies") for the version. Data in columns 314-320 may be sorted in increasing order of values in column 314.

As with the dependencies shown in FIGS. 3A-3B, the dependencies shown in FIG. 3C may facilitate the assessment of the popularity, stability, and/or health of versions of the software library project. Moreover, column 316 may provide flags and/or states representing health assessments for versions in column 314. For example, version "2.4" of the software library project may have a "GREEN" state because the version has a large number of incoming dependencies and/or a smaller number of outgoing dependencies. Version "0.9" may have a "YELLOW" state because the version has a small number of incoming dependencies and/or a slightly higher number of outgoing dependencies. Version "0.0.1" may have a "RED" state because the version has few incoming dependencies and/or more outgoing dependencies.

Status indicators in column 316 may be determined based on other factors and/or characteristics, in lieu of or in addition to dependencies in columns 318-320. For example, a version may be labeled (e.g., flagged) "RED" if the version hasn't been updated for a long time, was immediately followed by a newer version (e.g., indicating a broken version), and/or contains words such as "deprecated" or "do not use." A version may be labeled "YELLOW" if the version has a high amount (e.g., greater than 20%) of API deprecation and/or low check-in or commit activity. A version may be labeled "GREEN" if the version has little to no API deprecation, a higher number of committers, and/or moderate to high check-in or commit activity.

As a result, column 316 may provide recommendations related to use of different versions of the software library project. For example, a user may use status indicators in column 316 to omit the use of "RED" versions, carefully consider the use of "YELLOW" versions, and/or enable use of "GREEN" versions of the software library project.

Figure 4:
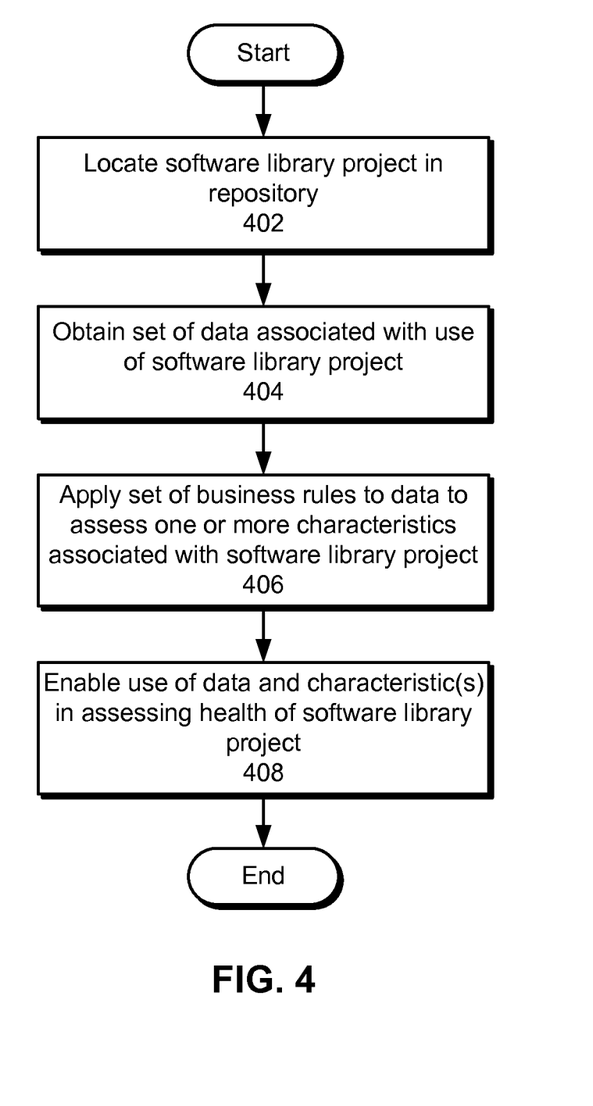
FIG. 4 shows a flowchart illustrating the process of facilitating use of a software library project in accordance with the disclosed embodiments.

FIG. 4 shows a flowchart illustrating the process of facilitating use of a software library project in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a software library project is located in a repository (operation 402). For example, the software library project may be located during crawling of a public (e.g., open source) repository and/or querying of a private (e.g., internal) repository.

Next, a set of data associated with use of the software library project is obtained (operation 404). The data may include a set of dependencies of calls and objects associated with the software library project, an activity history associated with the calls and the objects, a syntactic structure associated with the calls and the objects, version information associated with the software library project, and/or licensing information associated with the software library project. The activity history may include a commit metric (e.g., number of commits, number of committers, frequency of commits, commit date, number of modified files, number of modified lines, etc.), a release metric (e.g., release frequency, release date, number of releases, etc.), and a social activity metric (e.g., number of favorites, number of follows, number of shares, number of comments, etc.). The activity history may also include an issue history, a crash history, and/or a usage history. The version information may include compatibility information for one or more components (e.g., features) of the software library project.

A set of business rules is applied to the data to assess one or more characteristics associated with the software library project (operation 406). The characteristics may include a licensing characteristic, an activity characteristic, a popularity characteristic, a compatibility characteristic, and/or a stability characteristic. The business rules may further be adapted to the needs, requirements, and/or preferences of a user, group, and/or organization considering use of the software library project and/or assessing the health of the software library project.

Finally, use of the data and characteristic(s) in assessing the health of the software library project is enabled (operation 408). For example, the data, characteristic(s), and/or visualizations associated with the data and/or characteristic(s) may be provided to one or more users. The visualizations may include a chart, a heat map, a graph, a score, and an indicator. In turn, the data, characteristic(s), and/or visualizations may facilitate the identification and adoption of healthy (e.g., stable, compatible, reliable, active, popular, etc.) software library projects by the user(s), which in turn may simplify or streamline the development of software that uses the software library projects.

Figure 5:
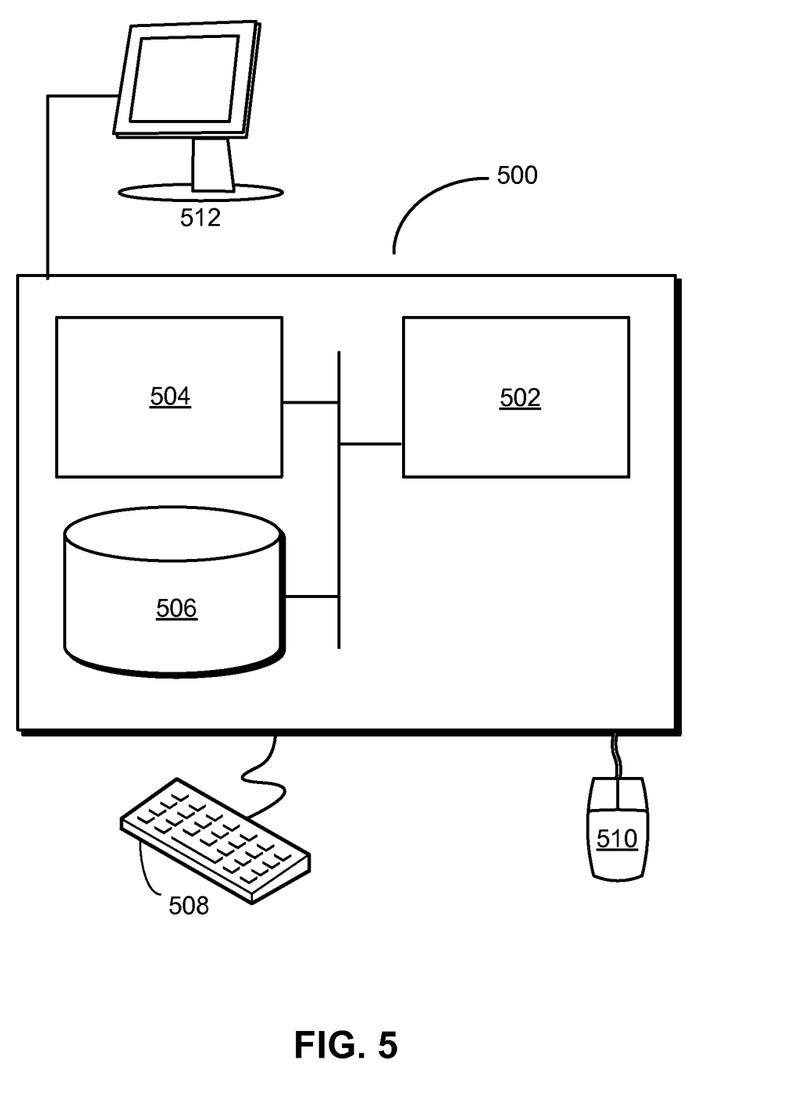
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices such as personal computers, laptop computers, workstations, servers, mobile phones, tablet computers, and/or portable media players. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating use of a software library project. The system may include a collection apparatus that obtains a set of data associated with use of the software library project. The data may include a set of dependencies of calls and objects associated with the software library project, an activity history associated with the calls and the objects, a syntactic structure associated with the calls and the objects, version information associated with the software library project, and/or licensing information associated with the software library project. The system may also include an analysis apparatus that applies a set of business rules to the data to assess one or more characteristics associated with the software library project. Finally, the system may include a management apparatus that enables use of the data and the one or more characteristics in assessing the health of the software library project.

In addition, one or more components of computer system 500 may be remotely located and connected to the other components over a network. Portions of the present embodiments (e.g., collection apparatus, analysis apparatus, management apparatus, etc.) may also be located on different nodes of a distributed system that implements the embodiments. For example, the present embodiments may be implemented using a cloud computing system that enables the assessment of health of a set of remote software library projects.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of a software library project, comprising:
   using one or more computers to:
   obtain a set of data associated with use of the software library project, wherein the data comprises a set of dependencies of calls and objects associated with the software library project;
   apply a set of business rules to the data to assess one or more characteristics associated with the software library project; and
   enable use of the data and the one or more characteristics in assessing a health of the software library project;
   wherein the set of data further comprises:
   an activity history associated with the calls and the objects,
   a syntactic structure associated with the calls and the objects,
   version information associated with the software library project, and
   licensing information associated with the software library project.

2. The computer-implemented method of claim 1, further comprising:
   locating the software library project in a repository.

3. The computer-implemented method of claim 2, wherein the repository is at least one of a public repository and a private repository.

4. The computer-implemented method of claim 1, wherein the activity history comprises at least one of:
   a commit metric;
   a release metric;
   a social activity metric;
   an issue history;
   a crash history; and
   a usage history.

5. The computer-implemented method of claim 4,
   wherein the commit metric is at least one of a number of commits, a number of committers, a frequency of commits, a commit date, a number of modified files, and a number of modified lines,
   the release metric is at least one of a release frequency, a release date, and a number of releases, and
   the social activity metric is at least one of a number of favorites, a number of follows, a number of shares, and a number of comments.

6. The computer-implemented method of claim 1, wherein the version information comprises compatibility information for one or more components of the software library project.

7. The computer-implemented method of claim 1, wherein the set of dependencies comprises incoming dependencies and outgoing dependencies.

8. The computer-implemented method of claim 1, wherein enabling use of the data and the one or more characteristics in assessing the health of the software library project comprises:
   providing the data and the one or more characteristics to one or more users; and
   providing a visualization associated with the data or the one or more characteristics to the one or more users.

9. The computer-implemented method of claim 8, wherein the visualization comprises at least one of a chart, a heat map, a graph, a score, and an indicator.

10. The computer-implemented method of claim 1, wherein the one or more characteristics comprise at least one of:
    a licensing characteristic;
    an activity characteristic;

a popularity characteristic;
a compatibility characteristic; and
a stability characteristic.

11. A system for facilitating use of a software library project, comprising:
one or more processors;
a memory coupled to the one or more processors;
wherein the one or more processors execute program instructions contained in code modules stored in the memory, wherein the code modules include:
a collection module that obtains a set of data associated with use of the software library project, wherein the data comprises a set of dependencies of calls and objects associated with the software library project;
an analysis module that applies a set of business rules to the data to assess one or more characteristics associated with the software library project; and
a management module that enables use of the data and the one or more characteristics in assessing a health of the software library project;
wherein the set of data further comprises:
an activity history associated with the calls and the objects,
a syntactic structure associated with the calls and the objects,
version information associated with the software library project, and
licensing information associated with the software library project.

12. The system of claim 11, wherein the collection module additionally:
locates the software library project in a repository.

13. The system of claim 11, wherein the activity history comprises at least one of:
a commit metric;
a release metric;
a social activity metric;
an issue history;
a crash history; and
a usage history.

14. The system of claim 11, wherein the version information comprises compatibility information for one or more components of the software library project.

15. The system of claim 11, wherein enabling use of the data and the one or more characteristics in assessing the health of the software library project comprises:
providing the data and the one or more characteristics to one or more users; and
providing a visualization associated with the data or the one or more characteristics to the one or more users.

16. The system of claim 11, wherein the one or more characteristics comprise at least one of:
a licensing characteristic;
an activity characteristic;
a popularity characteristic;
a compatibility characteristic; and
a stability characteristic.

* * * * *